(12) United States Patent
Dotlich

(10) Patent No.: US 9,745,704 B1
(45) Date of Patent: Aug. 29, 2017

(54) HELICOPTER LANDING PADS

(71) Applicant: John Dotlich, Brownsburg, IN (US)

(72) Inventor: John Dotlich, Brownsburg, IN (US)

( * ) Notice: Subject to any disclaimer, the term of this patent is extended or adjusted under 35 U.S.C. 154(b) by 0 days.

(21) Appl. No.: 15/427,740

(22) Filed: Feb. 8, 2017

Related U.S. Application Data

(60) Provisional application No. 62/293,081, filed on Feb. 9, 2016.

(51) Int. Cl.
*E01C 11/00* (2006.01)
*E01C 11/22* (2006.01)
*B64F 1/00* (2006.01)

(52) U.S. Cl.
CPC .............. *E01C 11/225* (2013.01); *B64F 1/00* (2013.01); *E01C 11/228* (2013.01); *E01C 2201/202* (2013.01)

(58) Field of Classification Search
CPC ................. E01C 11/225; E01C 11/228; E01C 2201/202; B64F 1/00
USPC ...................................... 404/31, 34
See application file for complete search history.

(56) References Cited

U.S. PATENT DOCUMENTS

| 5,013,029 A | * | 5/1991 | Vaux | ......................... | E01C 5/18 |
| | | | | | 404/32 |
| 2011/0174925 A1 | * | 7/2011 | Ying | ...................... | B64F 1/005 |
| | | | | | 244/114 R |
| 2014/0137487 A1 | * | 5/2014 | Mackintosh | .............. | E01C 9/10 |
| | | | | | 52/168 |

* cited by examiner

*Primary Examiner* — Raymond W Addie
(74) *Attorney, Agent, or Firm* — Maginot, Moore & Beck, LLP

(57) ABSTRACT

A helicopter take-off and landing pad (helipad) includes a drain conduit embedded within a surface, a bed of crushed aggregate within a portion of the surface graded to be inclined toward the drain conduit, and a plurality of pavers supported by the aggregate bed and defining a substantially level top surface to serve as a landing surface for a helicopter. The plurality of pavers are permeable to liquid on the top surface to communicate the liquid to the aggregate bed. A pump connected to the drain conduit is operable to discharge liquid directed from the aggregate bed through the drain conduit to a water separator that is operable to separate water from other liquid components of the discharged liquid. At least one collection tank is fluidly connected to the water separator to receive the other liquid components discharged by the water separator.

11 Claims, 1 Drawing Sheet

HELICOPTER LANDING PADS

PRIORITY CLAIM

The present application is a utility filing from and claims priority to U.S. provisional application No. 62/293,081, filed on Feb. 9, 2016, the entire disclosure of which is incorporated herein by reference.

BACKGROUND present disclosure relates to pads for launching and landing helicopters, namely "helipads".

A "heliport" is a small airport suitable only for use by helicopters. The heliport includes one or more helipads which are typically circular or square concrete pads of limited dimension since the helicopter does not need travel a significant distance linearly, as with traditional aircraft. Helipads are not limited to use in heliports. Many solo helipads are provided for a variety of reasons. Hospitals often include a single helipad for "medivac" or air ambulance helicopters used in the transport of patients in life-threatening situations. Many commercial buildings include a helipad for the convenience of its tenants. Even individuals may have a helipad for their personal use. Helipads are also used on large ships and on off-shore ocean platforms, such as drilling, oil or gas rigs.

The typical helipad fits within a 46'x46' square and includes a variety of landing and directional markings. The perimeter of the helipad is laced with omni-directional safety lights that serve dual functions as a guide for approaching helicopters and as a warning for persons near the helipad.

Helicopters, like traditional fixed-wing aircraft, require the use of de-icing liquids to prevent icing of the airfoil surfaces of the rotor blades. Like typical airports, many heliports include drain systems that receive de-icing liquid run-off, along with other liquids associated with aircraft operation and maintenance, such as fuel spills. The drain systems require specific construction of the landing pad to direct liquids to the drain system. At an airport, the taxiways and gate areas can include sloped surfaces to direct liquid to drain channels formed in the tarmac surface. Sloped surfaces are less desirable for helicopter landing pads. In many cases, any liquids on the surface of the helipad are sprayed off the helipad into a collection area separate from the helipad. This approach requires a significant quantity of water and does not ensure that the liquids are limited to the collection area.

There is a need for a helipad that can address the environmental issues associated with use of the helipad in an efficient manner.

SUMMARY

An improved helicopter landing pad (helipad) includes a drain conduit embedded within a surface, a bed of crushed aggregate within a portion of the surface graded to be inclined toward the drain conduit, and a plurality of pavers supported by the aggregate bed and defining a substantially level top surface to serve as a landing surface for a helicopter. The plurality of pavers are permeable to liquid on the top surface to communicate the liquid to the aggregate bed. A pump connected to the drain conduit is operable to discharge liquid directed from the aggregate bed through the drain conduit to a water separator that is operable to separate water from other liquid components of the discharged liquid. At least one collection tank is fluidly connected to the water separator to receive the other liquid components discharged by the water separator

DETAILED DESCRIPTION

Figure 1:
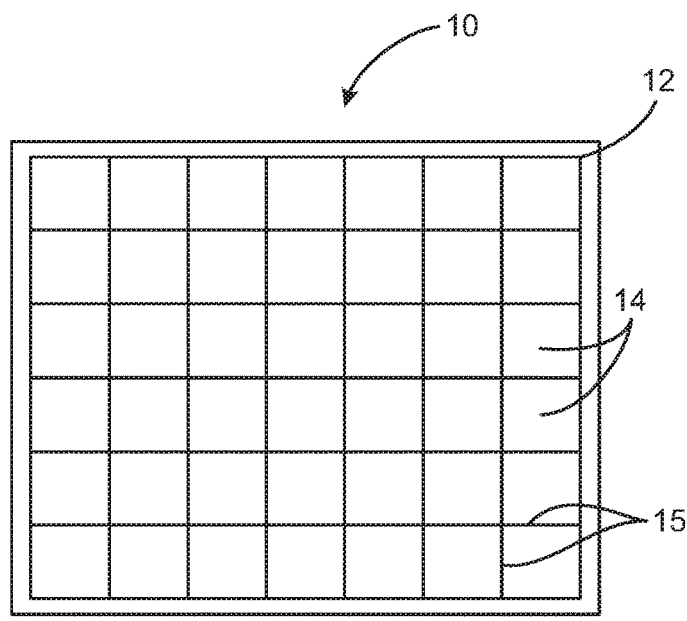
FIG. 1 is a top plan view of a helicopter landing and takeoff pad, or helipad, according to one feature of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
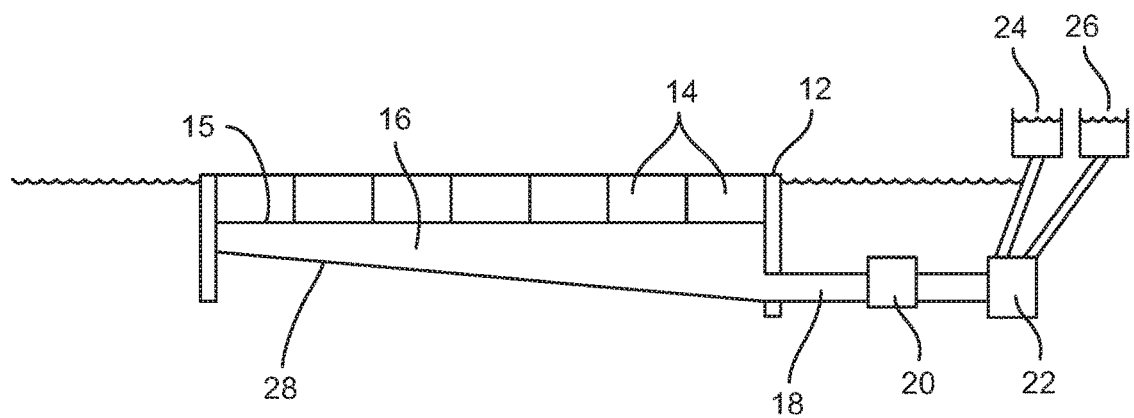
FIG. 2 is a side view of the helipad shown in FIG. 1.

The present disclosure contemplates a helipad 10 that is formed by a plurality of permeable pavers 14 installed within a concrete perimeter wall 12, as shown in FIGS. 1-2. The perimeter wall 12 defines the helipad area according to the relevant government regulations. Thus, in one specific embodiment, the perimeter wall defines a 46'x46' square, with the wall having a thickness of about one foot. The pavers can be rectangular or square, with a nominal dimension of 1'x1', in one example. The perimeter wall and pavers may be situated at or slightly above ground level or similar surface on which the helipad is placed. The pavers 14 can be of interlocking construction so that the pavers will not shift within the perimeter wall 12. In one embodiment, two opposite side edges define interlocking features, such as a series of complementary notches formed in the side edges that interlock when the pavers are placed side-by-side. The pavers define a generally level upper surface to serve as a stable landing surface for a helicopter.

In one important feature of the present disclosure, the pavers 14 are formed of a permeable material with sufficient strength and weather resistance to serve as a landing pad for a helicopter. In one specific embodiment, the pavers 14 are PaveDrain® concrete blocks sold by local distributors of PaveDrain, LLC. The joints 15 between pavers are open joints to facilitate liquid flow underneath the paver installation. In one specific embodiment, the joint is maintained at about ¼ inches as the pavers are installed. Rebar extends through the adjacent pavers to hold them together, with the ends of the rebar anchored in the perimeter wall 12.

The pavers 14 are installed on a graded bed of crushed aggregate 16, such as limestone. As shown in FIG. 2, the aggregate bed is graded to slope toward one side of the perimeter, and particularly to a drain conduit 18. The aggregate bed can be further graded to slop inward from the ends of the bed perpendicular to the one side of the perimeter. Thus, in one embodiment, the bed of aggregate can have a depth of 4-6 inches at three sides and can be graded to slope toward a depth of about 8-12 inches at the one side of the perimeter at the location of the drain conduit 18. This graded configuration ensures that liquid dropping into the aggregate bed will funnel to the drain conduit. The perimeter wall can be sized to extend below ground level to a depth sufficient to retain the crushed aggregate in the aggregate bed, as shown in FIG. 2. The aggregate bed is surrounded by a water-tight liner 28 that is anchored to the concrete perimeter 12, such as by batten strips. The liner 28 is configured to be impervious to petroleum and harsh chemicals, such as de-icing chemicals. The drain conduit 18 is sealed to the liner 28 to prevent any liquid leakage from the helipad installation. In one embodiment, the liner 28 is a specially treated polyester or HDPE such as the XR-5® Geomembrane, sold by Seaman Corp.

The drain conduit 18 is connected to a pump 20 and a water separator 22 that is operable to separate water from the environmentally impactful or hazardous liquids, such as oil and de-icer. The drain conduit is sized to accept the liquid run-off of the helipad to prevent any liquid form collecting on the surface of the helipad. Thus, in one specific embodiment, the drain conduit can be a PVC conduit with a diameter of 2-3 inches. The pump 20 is sized for a discharge rate that can match an expected volume of run-off. The hazardous liquids are directed to a collection tank 24, while the water is directed either to a separate collection tank 26 or to a ground water drain adjacent the helipad. The two collection tanks 24, 26 can be configured to permit extraction of the liquid collected within the respective tank. Alternatively, the separate collection tank 26 for receiving the water discharged by the water separator 22 can constitute a drainage pond so that separate extraction is not required. The helipad construction may be provided with a leak detection system to detect liquid leaks outside the liner 28, as well as any leaks in the conduit 18, pump 20, water separator 22 or collection tanks 24, 26. The pump 20 and water separator 22 are preferably buried but accessible for maintenance through an access conduit.

The helipad 10 may be provided with low-power LED lighting at the perimeter, as well as LED indicia embedded within the pavers. The lighting can be connected to a central controller that can be activated by smart devices, thereby providing the helicopter pilot with control. The central controller may also be integrated with a heating element embedded within the pavers to keep the paver surface ice-free The present disclosure should be considered as illustrative and not restrictive in character. It is understood that only certain embodiments have been presented and that all changes, modifications and further applications that come within the spirit of the disclosure are desired to be protected.

What is claimed is:

1. A helicopter take-off and landing pad (helipad) comprising:
    a drain conduit embedded within a surface;
    a bed of crushed aggregate within a portion of the surface graded to be inclined toward the drain conduit;
    a plurality of pavers supported by the aggregate bed and defining a substantially level top surface to serve as a landing surface for a helicopter, the plurality of pavers being permeable to liquid on the top surface to communicate the liquid to the aggregate bed;
    a pump connected to the drain conduit to discharge liquid directed from the aggregate bed through the drain conduit;
    a water separator at the outlet of the pump to separate water from other liquid components of the liquid; and
    at least one collection tank fluidly connected to the water separator to receive the other liquid components discharged by the water separator.

2. The helipad of claim 1, further comprising at least one of a retention pond and a collection tank separate from the at least one collection tank fluidly connected to the water separator to receive water from the water separator.

3. The helipad of claim 1, wherein the plurality of pavers are physically interlocking.

4. The helipad of claim 1, wherein the plurality of pavers are separated by open joints for passage of liquid therethrough to the aggregate bed.

5. The helipad of claim 1, wherein the payers are formed of a permeable concrete material.

6. The helipad of claim 1, further comprising a perimeter wall defining the perimeter of the helipad, wherein the payers are disposed inside the perimeter wall.

7. The helipad of claim 6, wherein the perimeter wall is formed at a depth within the surface to retain the crushed aggregate in the aggregate bed.

8. The helipad of claim 6, wherein the perimeter wall defines a perimeter with a dimension of 46 feet by 46 feet.

9. The helipad of claim 1, further comprising a water-tight liner between the aggregate bed and the surface.

10. The helipad of claim 8, wherein the water-tight liner is resistant to petroleum and de-icing chemicals.

11. The helipad of claim 1, wherein the surface is the ground.

\* \* \* \* \*